(12) United States Patent
Rose et al.

(10) Patent No.: US 9,535,497 B2
(45) Date of Patent: Jan. 3, 2017

(54) PRESENTATION OF DATA ON AN AT LEAST PARTIALLY TRANSPARENT DISPLAY BASED ON USER FOCUS

(71) Applicant: Lenovo (Singapore) Pte. Ltd., New Tech Park (SG)

(72) Inventors: Amy Leigh Rose, Chapel Hill, NC (US); Nathan J. Peterson, Durham, NC (US); John Scott Crowe, Durham, NC (US); Bryan Loyd Young, Tualatin, OR (US); Jennifer Lee-Baron, Morrisville, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 14/548,938

(22) Filed: Nov. 20, 2014

(65) Prior Publication Data

US 2016/0147297 A1    May 26, 2016

(51) Int. Cl.
*G09G 5/00* (2006.01)
*G06F 3/01* (2006.01)
(Continued)

(52) U.S. Cl.
CPC .............. *G06F 3/013* (2013.01); *G06T 7/408* (2013.01); *G06T 11/001* (2013.01); *G06T 2210/62* (2013.01)

(58) Field of Classification Search
USPC .... 345/156, 672, 158, 174; 116/200; 434/62
See application file for complete search history.

(56) References Cited

U.S. PATENT DOCUMENTS 2,510,344 A    6/1950  Law
2,567,654 A    9/1951  Siezen
(Continued)

FOREIGN PATENT DOCUMENTS

DE    10310794     9/2004
DE    69937592    10/2008
(Continued)

OTHER PUBLICATIONS

Kern et al., "Making Use of Drivers' Glance onto the Soreen for Explicit Gaze-Based Interaction". In Proceedings of Second International Conference on Automotive User Interfaces and Interactive Vehicular Applications (AutomotiveUI 2010), Nov. 11-12, 2010, Pittsburgh, Pennsylvania, USA, pp. 110-113.
(Continued)

*Primary Examiner* — Thuy Pardo
(74) *Attorney, Agent, or Firm* — John L. Rogitz; John M. Rogitz (57) ABSTRACT

In one aspect, a device includes a processor, at least one at least partially transparent display accessible to the processor, at least one eye sensor accessible to the processor, and a memory accessible to the processor. The memory bears instructions executable by the processor to present content at a first location on the at least partially transparent display and, based at least in part on data from the eye sensor, determine whether a user is looking one of at least substantially at the first location and past the first location. The instructions are also executable to, in response to a determination that the user is looking past the first location, remove the content from presentation at the first location.

20 Claims, 7 Drawing Sheets (51) Int. Cl.
*G06T 7/40* (2006.01)
*G06T 11/00* (2006.01)

(56) References Cited

U.S. PATENT DOCUMENTS

| | | |
|---|---|---|
| 3,418,426 A | 12/1968 | Schlegel et al. |
| 3,628,854 A | 12/1971 | Jampolsky |
| 4,082,433 A | 4/1978 | Appeldorn et al. |
| 4,190,330 A | 2/1980 | Berreman |
| 4,577,928 A | 3/1986 | Brown |
| 5,579,037 A | 11/1996 | Tahara et al. |
| 5,583,702 A | 12/1996 | Cintra |
| 5,731,805 A | 3/1998 | Tognazzini et al. |
| 5,831,594 A | 11/1998 | Tognazzini et al. |
| 5,850,206 A | 12/1998 | Kashiwagi |
| 5,886,683 A | 3/1999 | Tognazzini et al. |
| 5,898,423 A | 4/1999 | Tognazzini et al. |
| 6,046,847 A | 4/2000 | Takahashi |
| 6,437,758 B1 | 8/2002 | Nielsen et al. |
| 6,577,329 B1 | 6/2003 | Flickner et al. |
| 6,873,314 B1 | 3/2005 | Campbell |
| 8,160,311 B1 | 4/2012 | Schaefer |
| 8,493,390 B2 | 7/2013 | Kalinli |
| 8,594,374 B1 | 11/2013 | Bozarth |
| 8,600,362 B1 | 12/2013 | Kim |
| 8,767,014 B2 | 7/2014 | Vaught et al. |
| 8,885,882 B1 | 11/2014 | Yin et al. |
| 8,893,164 B1 | 11/2014 | Teller |
| 8,922,480 B1 | 12/2014 | Freed et al. |
| 8,941,476 B2* | 1/2015 | Hill ............... G06F 3/016 116/200 |
| 8,957,847 B1 | 2/2015 | Karakotsios et al. |
| 9,035,874 B1 | 5/2015 | Fowers et al. |
| 9,096,920 B1 | 8/2015 | Gomez et al. |
| 9,152,221 B2 | 10/2015 | Denker et al. |
| 2001/0030711 A1 | 10/2001 | Saito |
| 2002/0077169 A1 | 6/2002 | Kelly et al. |
| 2003/0140120 A1 | 7/2003 | Hartman |
| 2004/0160419 A1 | 8/2004 | Padgitt |
| 2004/0183749 A1 | 9/2004 | Vertegaal |
| 2005/0086610 A1 | 4/2005 | MacKinlay et al. |
| 2005/0243054 A1 | 11/2005 | Beymer et al. |
| 2006/0093998 A1 | 5/2006 | Vertegaal |
| 2006/0109237 A1 | 5/2006 | Morita et al. |
| 2006/0109238 A1 | 5/2006 | Lau et al. |
| 2006/0110008 A1 | 5/2006 | Vertegaal et al. |
| 2006/0139318 A1 | 6/2006 | Kariathungal et al. |
| 2006/0139319 A1 | 6/2006 | Kariathungal et al. |
| 2006/0256083 A1 | 11/2006 | Rosenberg |
| 2006/0256094 A1 | 11/2006 | Inagaki |
| 2006/0256133 A1 | 11/2006 | Rosenberg |
| 2007/0078552 A1 | 4/2007 | Rosenberg |
| 2007/0164990 A1 | 7/2007 | Bjorklund et al. |
| 2007/0233692 A1 | 10/2007 | Lisa et al. |
| 2008/0227538 A1 | 9/2008 | Kelly et al. |
| 2008/0266252 A1 | 10/2008 | Keates et al. |
| 2009/0065578 A1 | 3/2009 | Peterson et al. |
| 2009/0097705 A1 | 4/2009 | Thorn |
| 2009/0146775 A1 | 6/2009 | Bonnaud et al. |
| 2009/0204410 A1 | 8/2009 | Mozer et al. |
| 2009/0248692 A1 | 10/2009 | Tsukagoshi et al. |
| 2009/0259349 A1 | 10/2009 | Golenski |
| 2009/0315740 A1 | 12/2009 | Hildreth et al. |
| 2010/0007601 A1 | 1/2010 | Lashina et al. |
| 2010/0045596 A1 | 2/2010 | De |
| 2010/0079508 A1 | 4/2010 | Hodge et al. |
| 2010/0171720 A1 | 7/2010 | Craig et al. |
| 2010/0211918 A1 | 8/2010 | Liang et al. |
| 2010/0220897 A1 | 9/2010 | Ueno et al. |
| 2011/0007142 A1 | 1/2011 | Perez et al. |
| 2011/0065451 A1 | 3/2011 | Danado et al. |
| 2011/0141011 A1 | 6/2011 | Lashina et al. |
| 2011/0175932 A1 | 7/2011 | Yu et al. |
| 2011/0213664 A1 | 9/2011 | Osterhout et al. |
| 2011/0213709 A1 | 9/2011 | Newman et al. |
| 2011/0276961 A1 | 11/2011 | Johansson et al. |
| 2012/0032817 A1 | 2/2012 | Cleveland |
| 2012/0032983 A1 | 2/2012 | Nishibe et al. |
| 2012/0105486 A1 | 5/2012 | Lankford et al. |
| 2012/0149309 A1 | 6/2012 | Hubner et al. |
| 2012/0169582 A1 | 7/2012 | Tschirhart |
| 2012/0200490 A1 | 8/2012 | Inada |
| 2012/0220311 A1 | 8/2012 | Rodriguez et al. |
| 2012/0256967 A1 | 10/2012 | Baldwin et al. |
| 2012/0268268 A1 | 10/2012 | Bargero |
| 2013/0012305 A1 | 1/2013 | Kelly et al. |
| 2013/0014052 A1 | 1/2013 | Frey et al. |
| 2013/0021459 A1 | 1/2013 | Vasilieff et al. |
| 2013/0027302 A1 | 1/2013 | Iwaizumi et al. |
| 2013/0044042 A1 | 2/2013 | Olsson et al. |
| 2013/0054622 A1 | 2/2013 | Karmarkar et al. |
| 2013/0057573 A1 | 3/2013 | Chakravarthula et al. |
| 2013/0128364 A1 | 5/2013 | Wheeler et al. |
| 2013/0135196 A1 | 5/2013 | Park et al. |
| 2013/0169754 A1 | 7/2013 | Klinghult |
| 2013/0170755 A1 | 7/2013 | Dalton et al. |
| 2013/0176208 A1 | 7/2013 | Tanaka et al. |
| 2013/0198056 A1 | 8/2013 | Aldrey et al. |
| 2013/0201305 A1 | 8/2013 | Sibecas et al. |
| 2013/0208014 A1* | 8/2013 | Fleck ............... G06K 9/00684 345/672 |
| 2013/0246663 A1 | 9/2013 | Raveendran et al. |
| 2013/0254716 A1 | 9/2013 | Mishra |
| 2013/0260360 A1 | 10/2013 | Baurmann et al. |
| 2013/0307762 A1 | 11/2013 | Ashbrook et al. |
| 2013/0307771 A1 | 11/2013 | Parker et al. |
| 2013/0321265 A1 | 12/2013 | Bychkov et al. |
| 2013/0340005 A1 | 12/2013 | Kwan |
| 2013/0340006 A1 | 12/2013 | Kwan |
| 2014/0002352 A1 | 1/2014 | Jacob et al. |
| 2014/0038137 A1* | 2/2014 | Hill ............... G06F 3/016 434/62 |
| 2014/0108309 A1 | 4/2014 | Frank et al. |
| 2014/0129987 A1 | 5/2014 | Feit et al. |
| 2014/0146075 A1 | 5/2014 | Takasu |
| 2014/0168054 A1 | 6/2014 | Yang et al. |
| 2014/0168056 A1 | 6/2014 | Swaminathan et al. |
| 2014/0176813 A1 | 6/2014 | Conness et al. |
| 2014/0204029 A1 | 7/2014 | Lopez et al. |
| 2014/0237366 A1 | 8/2014 | Poulos et al. |
| 2014/0247232 A1 | 9/2014 | George-Svahn et al. |
| 2014/0247286 A1* | 9/2014 | Chi ............... G09G 3/003 345/672 |
| 2014/0266702 A1 | 9/2014 | Forster-Knight |
| 2014/0267034 A1 | 9/2014 | Krulce et al. |
| 2014/0267400 A1 | 9/2014 | Mabbutt et al. |
| 2014/0270407 A1 | 9/2014 | Balakrishnan et al. |
| 2014/0272810 A1 | 9/2014 | Fields et al. |
| 2014/0292665 A1 | 10/2014 | Lathrop et al. |
| 2014/0298257 A1 | 10/2014 | Grandhi |
| 2014/0306826 A1 | 10/2014 | Ricci |
| 2014/0310256 A1 | 10/2014 | Olsson |
| 2014/0313120 A1 | 10/2014 | Kamhi |
| 2014/0317524 A1 | 10/2014 | VanBlon et al. |
| 2014/0333566 A1 | 11/2014 | Lee et al. |
| 2014/0344012 A1 | 11/2014 | Kamhi et al. |
| 2014/0361971 A1 | 12/2014 | Sala |
| 2014/0364212 A1 | 12/2014 | Osman et al. |
| 2015/0042552 A1 | 2/2015 | Tsoref |
| 2015/0049012 A1* | 2/2015 | Liu ............... G02B 27/017 345/156 |
| 2015/0066980 A1 | 3/2015 | Kim |
| 2015/0070481 A1 | 3/2015 | S. et al. |
| 2015/0094118 A1 | 4/2015 | Rodolico |
| 2015/0113454 A1 | 4/2015 | McLaughlin |
| 2015/0139508 A1 | 5/2015 | Ye |
| 2015/0160461 A1 | 6/2015 | Starner et al. |

(56) References Cited

U.S. PATENT DOCUMENTS

| | | | |
|---|---|---|---|
| 2015/0169048 | A1 | 6/2015 | Peterson et al. |
| 2015/0205348 | A1 | 7/2015 | Nortrup et al. |

FOREIGN PATENT DOCUMENTS

| | | |
|---|---|---|
| EP | 0880090 | 11/1998 |
| JP | H08278134 | 10/1996 |
| JP | H1091378 A | 4/1998 |
| JP | H11110120 | 4/1999 |
| WO | 2004051392 | 6/2004 |
| WO | 2016045784 A1 | 3/2016 |

OTHER PUBLICATIONS

Jacob et al., "Eye Tracking in Human-Computer Interaction and Usability Research: Ready to Deliver the Promises",The Mind's Eye: Cognitive and Applied Aspects of Eye Movement Research. Hyona, Radach & Deubel (eds.) Oxford, England, 2003: 99, 573-605.

Qvardfordt et al., "Conversing with the User Based on Eye-Gaze Patterns", In the CHI '05 Proceedings of the SIGCHI Conference on Human Factors in Computing Systems, ACM, New York, Apr. 2-7, 2005, pp. 221-230.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking", related U.S. Appl. No. 14/132,663, Non-Final Office Action dated Sep. 22, 2015.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking", related U.S. Appl. No. 14/132,663, Applicant's response to Non-Final Office Action dated Oct. 20, 2015.

Xin Feng, Paul Hilburger, "Providing Last Known Browsing Location Cue Using Movement-Oriented Biometric Data", file history of related U.S. Appl. No. 14/137,451, filed Dec. 20, 2013.

Grigori Zaitsev, Russell Speight Vanblon, "Projection of Images on Side Window of Vehicle", file history of related U.S. Appl. No. 14/639,263, filed Mar. 5, 2015.

Russell Speight Vanblon, Neal Robert Caliendo Jr.; " Automatic Magnification and Selection Confirmation" file history of related U.S. Appl. No. 14/322,119, filed Jul. 2, 2014.

Russell Speight Vanblon, Neal Robert Caliendo Jr.; "Magnification Based on Eye Input" file history of related U.S. Appl. No. 14/546,962, filed Nov. 18, 2014.

Russell Speight Vanblon, Suzanne Marion Beaumont, Rod David Waltermann, "Detecting Pause in Audible Input to Device" file history of related U.S. Appl. No. 14/095,369, filed Dec. 3, 2013.

Suzanne Marion Beaumont, Russell Speight Vanblon, Rod D. Waltermann, "Devices and Methods to Receive Input at a First Device and Present Output in Response on a Second Device Different from the First Device" file history of related U.S. Appl. No. 14/095,093, filed Dec. 3, 2013.

Jonathan Gaither Knox, Rod D. Waltermann, Liang Chen, Mark Evan Cohen, "Initiating Personal Assistant Application Based on Eye Tracking and Gestures" file history of related U.S. Appl. No. 14/095,235, filed Dec. 3, 2013.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking" file history of related U.S. Appl. No. 14/132,663, filed Dec. 18, 2013.

Russell Speight Vanblon, Rod David Waltermann, John Carl Mese, Arnold S. Weksler, Nathan J. Peterson, "Detecting Noise or Object Interruption in Audio Video Viewing and Altering Presentation Based Thereon" file history of related U.S. Appl. No. 14/158,990, filed Jan. 20, 2014.

Russell Speight Vanblon, Axel Ramirez Flores, Jennifer Greenwood Zawacki, Alan Ladd Painter, "Skin Mounted Input Device" file history of related U.S. Appl. No. 14/1162,115, filed Jan. 23, 2014.

Axel Ramirez Flores, Rod David Waltermann, James Anthony Hunt, Bruce Douglas Gress, James Alan Lacroix, "Glasses with Fluid-Fillable Membrane for Adjusting Focal Length of One or More Lenses of the Glasses" file history of related U.S. Appl. No. 14/453,024, filed Aug. 6, 2014.

Steven Richard Perrin, Jianbang Zhang, John Weldon, Scott Edwards Kelso, "Initiating Application and Performing Function Based on Input" file history of related U.S. Appl. No. 14/557,628, filed Dec. 2, 2014.

Rod David Waltermann, John Carl Mese, Nathan J. Peterson, Arnold S. Weksler, Russell Speight Vanblon, "Movement of Displayed Element from One Display to Another" file history of related U.S. Appl. No. 14/550,107, filed Nov. 21, 2014.

Wikipedia, "Electromyography", definition; http://en.wikipedia.org/wiki/Electromyogrpahy, printed from website Jan. 27, 2015.

Isource: "Raise to Speak Makes Sid Wonderfully Useful (Once You Know How to Use It)", http:///isource.com/10/01/raise-to-speak-makes-sid-wonderfully-useful-once-you-know-how-to-use-it/ Web printout Nov. 15, 2013.

Tactus Technology, "Taking Touch Screen Interfaces Into A New Dimension", 2012 (13 pages).

Arthur Davis, Frank Kuhnlenz, "Optical Design Using Fresnel Lenses, Basic Principles and some Practical Examples" Optik & Photonik, Dec. 2007.

Superfocus, "See The World in Superfocus Revolutionary Eyeglasses Give You the Power To Focus Your Entire View At Any Distance", http://superfocus.com/eye-care-practitioners, printed from website Jun. 24, 2014.

Darren Quick, "PixelOptics to Launch 'world's first electronic focusing eyewear'", http://www.gizmag.com/pixeloptics-empower-electroni-focusing-glasses/17569/. Jan. 12, 2011.

Insight News, "Electronic-lens company PixelOptics is bankrupt", htttp://www.insightnews.com.au/_blog/NEWS_NOW!/post/lens/electronic-lens-company-pixeloptics-is-bankrupt/. Dec. 12, 2013.

Wikipedia, "Extended Display Identification Data", Definition; http://en.wikipedia.org/wiki/Extended_display_Identification_data, printed from website Oct. 10, 2014.

Extron , "Digital Connection, Understanding EDID—Extended Display Identification Data", Fall 2009, www.extron.com.

"Relationship Between Inches, Picas, Points, Pitch, and Twips", Article ID: 76388; http://support2.microsoft.com/KB/76388. Printed Oct. 10, 2014.

Wikipedia, "Polarizer" Definition; http://en.wikipedia.org/wiki/Polarizer, printed from website Jan. 14, 2015.

Wikepedia, "Smart Glass" Definition, http://en.wikipedia.org/wiki/Smart_glass, printed from website Jan. 14, 2015.

Wikipedia, "Microphone array", definition, http://en.wikipedia.org/wiki/Microphone_array, printed from website Jan. 22, 2015.

Wikipedia, "Beamforming", definition; http://en.wikipedia.org/wiki/Beamforming, printed from website Jan. 22, 2015.

"Understanding & Using Directional Microphones", http://www.soundonsound.com/sos/sep00/articles/direction.htm; Published in SOS Sep. 2000.

Wikipedia, "Microphone", definition; http://en.wilipedia.org/wkik/microphone, printed from website Jan. 22, 2015.

Thalmiclabs, "Myo-Tech Specs", http://www.thalmic.com/en/myo/techspecs, printed from website Jan. 27, 2015.

Thalmiclabs, "Myo Gesture Control Armband" http://www.thalmic.com/en/myo, printed from website Jan. 27, 2015.

Kern et al., "Making Use of Drivers Glance onto the Screen for Explicit Gaze-Based Interaction", In Proceedings of the Second International Conferene on Automotive User Interfaces and Interactive Vehicular Appiications (AutomotiveUI 2010), Nov. 11-12, 2010, Pittsburgh, Pennsylvania, USA, pp. 110-113.

Jacob et al., "Eye Tracking in Human-Computer Interaction and Usability Research: Ready to Deliver the Promises", The Mind's Eye: Cognitive and Applied Aspects of Eye Movement Research. Hyona, Radach & Deubel (eds.) Oxford, England, 2003, 99. 573-605.

(56) References Cited

OTHER PUBLICATIONS

Qvardfordt et al., "Conversing with the User Based on Eye-Gaze Patterns", In the CHI '05 Proceedings of the SIGCHI Conference on Homan Factors in Computing Systems, ACM, New York, Apr. 24, 2009, pp. 221-230.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking", related U.S. Appl. No. 14/132,663, Non-Final Office Action dated Jan. 13, 2016.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking", related U.S. Appl. No. 14/132,663, Applicant's Response to Non-Final Office Action filed Apr. 1, 2016.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking", related U.S. Appl. No. 14/132,663, Final Office Action dated Jun. 29, 2016.

Xin Feng, "Real-Time Detection of User Intention Based on Kinematics Analysis of Movement-Oriented Biometric Data", related U.S. Appl. No. 14/137,472, Final Office Action dated Aug. 11, 2016.

Xin Feng "Real-Time Detection of User Intention Based on Kinematics Analysis of Movement-Oriented Biometric Data", related pending U.S. Appl. No. 14/137,472 non-final office action dated Mar. 11, 2016.

Xin Feng, Paul Hilburger, "Providing Last Known Browsing Location Cue Using Movement-Oriented Biometric Data", related pending U.S. Appl. No. 14/137,451 non-final office action dated Mar. 9, 2016.

\* cited by examiner

---
PRESENTATION OF DATA ON AN AT LEAST PARTIALLY TRANSPARENT DISPLAY BASED ON USER FOCUS

FIELD

The present application relates generally to presentation of data on an at least partially transparent display based on a user's focus.

BACKGROUND

Data is sometimes presented on displays that are at least partially transparent. However, as recognized herein, when attempting to look through such a display rather than at it, such data can obstruct a user's view. This can be frustrating, burdensome, and even unsafe.

SUMMARY

Accordingly, in one aspect a device includes a processor, at least one at least partially transparent display accessible to the processor, at least one eye sensor accessible to the processor, and a memory accessible to the processor. The memory bears instructions executable by the processor to present content at a first location on the at least partially transparent display and, based at least in part on data from the eye sensor, determine whether a user is looking one of at least substantially at the first location and past the first location. The instructions are also executable to, in response to a determination that the user is looking past the first location, remove the content from presentation at the first location.

In another aspect, a method includes presenting information on an at least partially transparent display, determining whether a user is focusing one of on the information and past the information, and in response to a determination that the user is focusing past the information, removing the information from a direction of the user's focus.

In still another aspect, glasses comprise a processor, at least one at least partially transparent lens display accessible to the processor, at least one eye sensor accessible to the processor, and a memory accessible to the processor. The memory bears instructions executable by the processor to present data on the at least one at least partially transparent lens display, determine whether a wearer of the glasses is focusing one of on the data and elsewhere, and is response to a determination that the wearer is focusing elsewhere, remove the data from a direction of the wearer's focus.

The details of present principles, both as to their structure and operation, can best be understood in reference to the accompanying drawings, in which like reference numerals refer to like parts, and in which:

BRIEF DESCRIPTION OF THE DRAWINGS

FIG. 4A is an example elevational view of a vehicle in accordance with present principles, while

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, its addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a earner wave) such as a random access memory (RAM), read-only memory (ROM), electrically erasable programmable read-only memory (EEPROM), compact disk read-only memory (CD-ROM) or other optical, disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
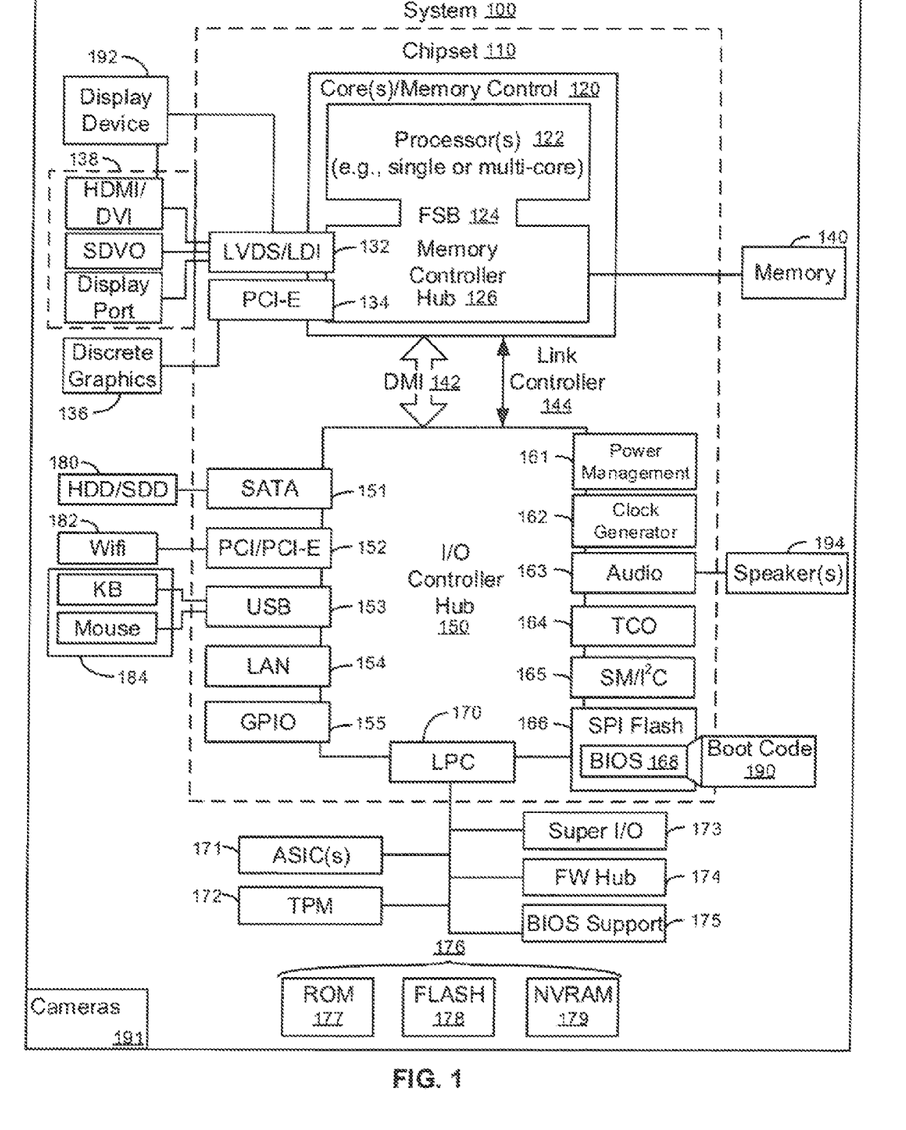
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®).

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub ISO that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, an at least partially transparent display, etc.). A block 138 includes some examples of technologies that may be supported via the LVDS interface 132 (e.g., serial, digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16 lane (x16) PCI-E port tor an external PCI-E-based graphics card (including e.g. one of more GPUs). An example system may include AGP or PCI-E for support of graphics.

The I/O hub controller 150 includes a variety of interfaces. The example of FIG. 1 includes a SATA interlace 151, one or more PCI-E interfaces 152 (optionally one or more legacy PCI interfaces), one or more USB interfaces 153, a LAN interface 154 (more generally a network interlace for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interlace 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

FIG. 1 also shows that the system 100 includes at least one and optionally plural eye sensors such as e.g. cameras 191 for gathering one or more images and providing input related thereto to the processor 122. The cameras 191 may be, e.g., thermal imaging cameras, digital cameras such as webcams, and/or cameras integrated into the system 100 and controllable by the processor 122 to gather pictures/images and/or video such as of a user's face and eyes (and/or eye movement, locus and/or focal, length, etc.). Note that in addition to or in lieu of cameras, still other eye sensors for providing input to the processor 122 may be used in accordance with present principles, such as e.g. optical sensors, infrared transceivers, ultrasound transceivers, light emitting diode (LED) transceivers, etc.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration, and/or movement of the system 100 and providing input related thereto to the processor 122, and/or an audio receiver/microphone providing input to the processor 122 e.g. based on a user providing audible input to the microphone. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
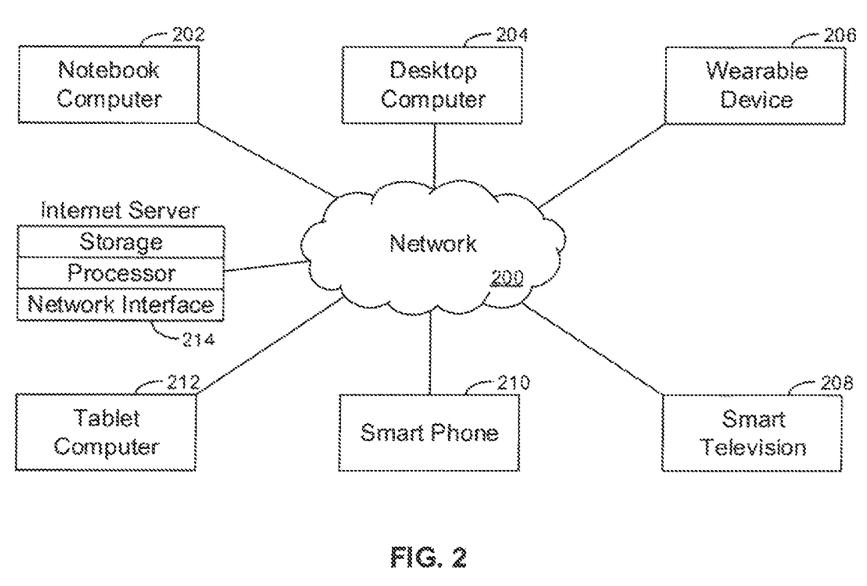
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
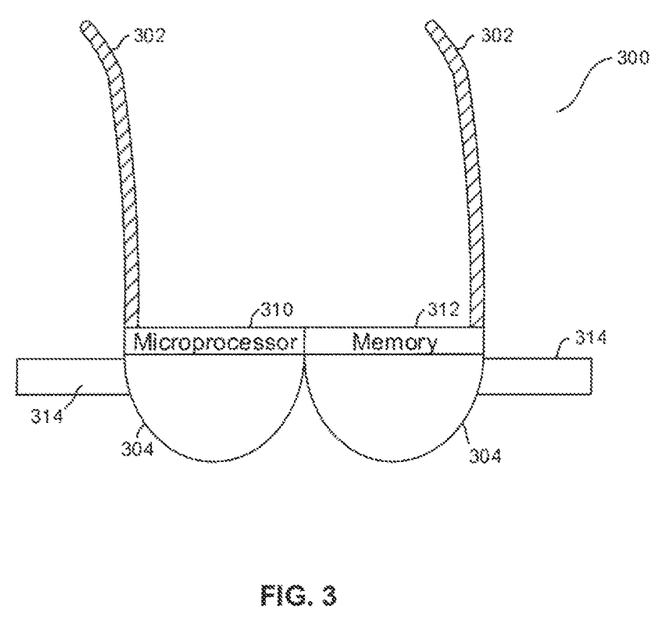
FIG. 3 is a perspective view of example eye glasses in accordance with present principles.

Referring to FIG. 3, it shows a perspective view of example eye glasses 300 that may be used in accordance with present principles (e.g. presenting or not presenting content using the glasses based on the direction and/or depth of a user's focus), it being understood that the system 100 may be e.g. embodied in the glasses 300 and accordingly the glasses 300 may include some or all of the elements of the system 100 discussed above. In any case, the glasses 300 include a frame 302 which may comprise elongated arms for positioning over the ears of a person, as well as a center portion between the elongated arms at respective first ends of the arms to connect the arms, and/or engage with and/or couple to one or more lens displays and other components of the glasses 300 to be described below.

Thus, the glasses 300 include one or more at least partially transparent lens displays 304 through which a user may view objects in the user's line of sight when the glasses 300 are worn on their face. Note that the at least partially transparent lens displays 304 are also configured for presenting information thereon for viewing by a user, such as e.g. weather information, directions, sports scores, Internet search results, etc. Thus, in one respect the at least partially transparent lens displays 304 may be thought of as so-called "heads-up" displays and/or "head-mounted" displays.

In addition to the foregoing, the glasses 300 may also include a processor 310 and memory 312 accessible to the processor 310 and storing data such as e.g. instructions executable by the processor 310 to undertake present principles (e.g. instructions storing the logic discussed in reference to FIG. 5 below). As also shown in FIG. 3, the glasses 300 may comprise one or more cameras 314 such as e.g. digital cameras and/or cameras configured and/or oriented for gathering images of at least one and optionally plural of a user's eyes (e.g. and specifically their pupils) when wearing the glasses 300 and/or to track eye movement of the eyes of the user when wearing the glasses. Thus, using eye tracking principles and/or software, the processor 310 may determine which direction and/or to which objects the user is looking, as well as determine the depth of the user's focus in accordance with present principles.

Before moving on to the description of FIG. 4, it is to also be understood in reference to the glasses 300 of FIG. 3 that they may comprise a network interface for communication over at least one network such as the Internet, a WAN, a LAN, etc. under direction of the processors) 310 with another device such as e.g. a smart phone and/or a vehicle such as the one to be described below, and furthermore the glasses 300 may comprise e.g. a battery providing power to one or more elements of the glasses 300, where the battery is chargeable through a charge port on the glasses 300 which is in electrical communication with the battery.

Figure 4A:
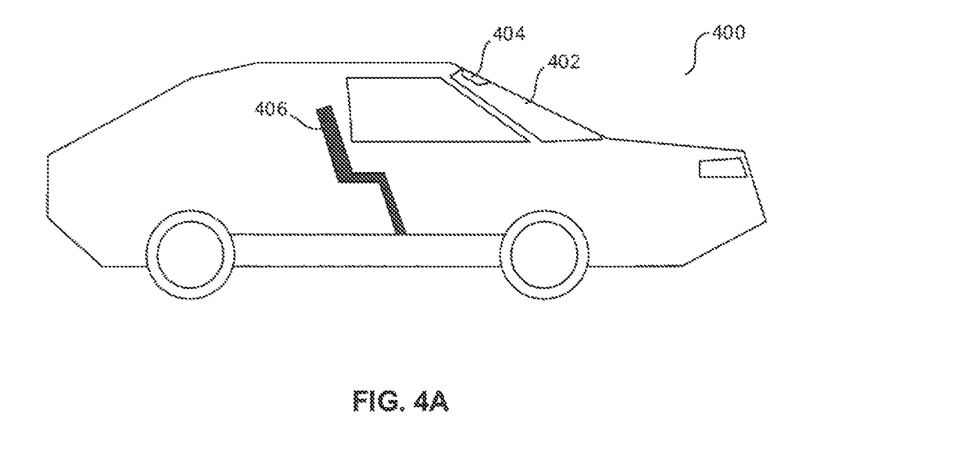
Figure 4B:
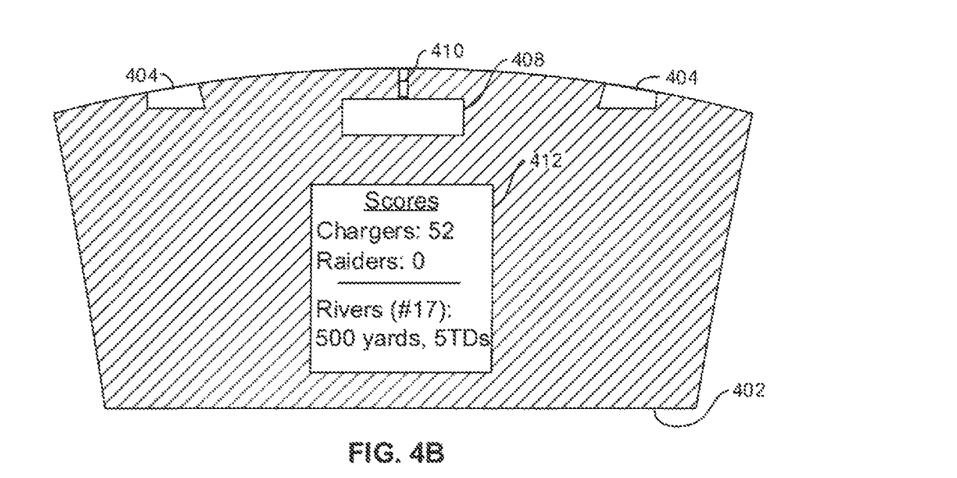
FIG. 4B is an example block diagram of an at least partially transparent windshield display arrangeable on the vehicle of FIG. 4A.

Now in cross-reference to FIGS. 4A and 4B, they show an example vehicle 400 in which a windshield 402 is at least partially comprised of, if not entirely comprised of, an at least partially transparent display (e.g. touch-enabled transparent display) in accordance with present principles. The vehicle 400 also includes at least one camera 404 oriented to gather images of a user's eyes when seated in at least one seat 406 (e.g. driver's seat and/or passenger's seat(s)) to determine a direction and depth of the user's focus in accordance with present principles. Furthermore, in some embodiments a rear view mirror assembly 408 may comprise a camera 410 disposed thereon which is also oriented to gather images of a user's eyes in accordance with present principles. As may be appreciated from FIG. 4B, the at least partially transparent display windshield 402 presents sports score information 412 on a central location of the display windshield 402.

Before moving on in the detailed description to the description of other figures, it is to be understood that the system 100 may be e.g. embodied in the vehicle 400 and accordingly the vehicle 400 may include some or all of the elements of the system 100 discussed above (e.g. at least one processor, storage, a network interface, etc.) although not shown in FIGS. 4A and 4B for simplicity. It is to also be understood that in some embodiments at least one of the cameras 404 may be incorporated into and/or integrated with the display windshield 402.

Figure 5:
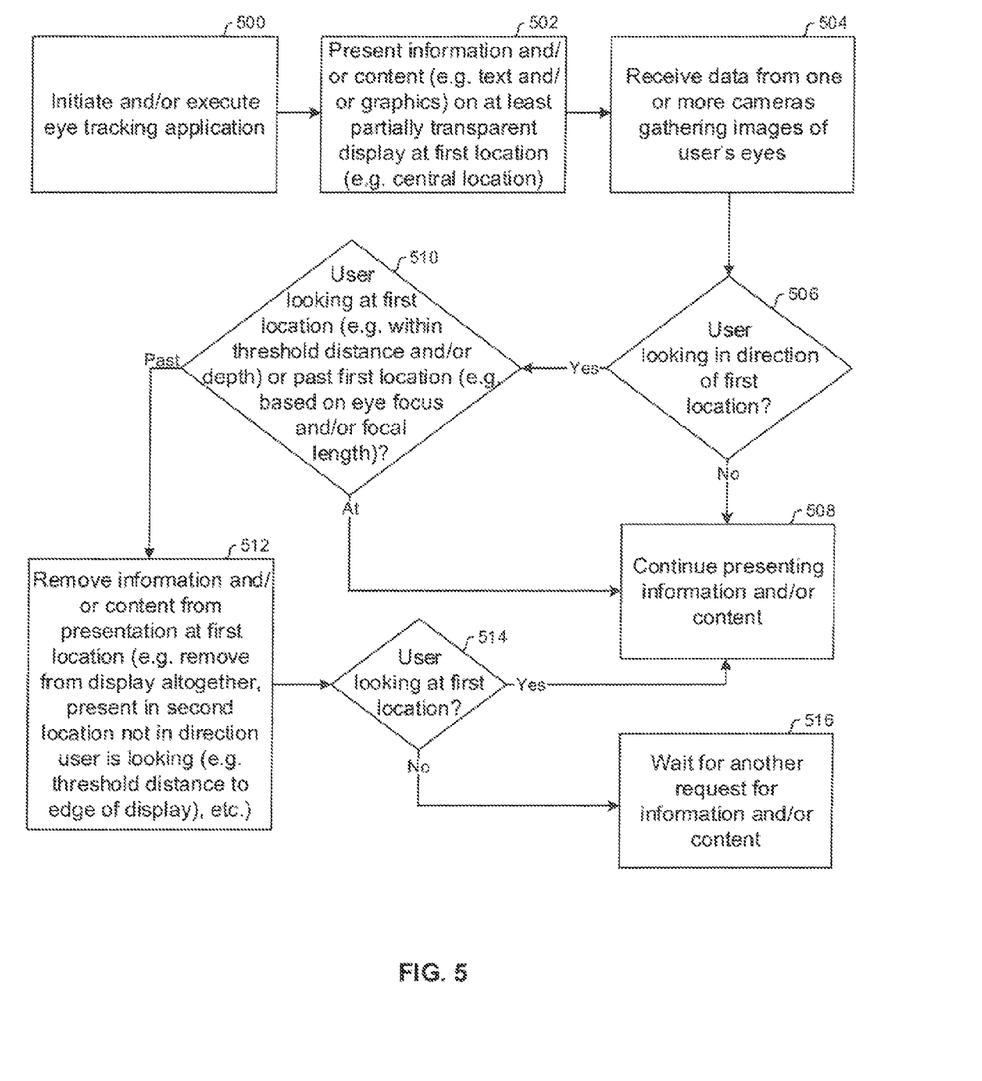
FIG. 5 is a flow chart showing an example algorithm in accordance with present principles.

Referring to FIG. 5, it shows example logic that may be undertaken by a device such as the system 100, the glasses 300, and/or vehicle 400 in accordance with present principles. Beginning at block 500, the logic initiates and/or executes an eye tracking application, and/or software for undertaking present principles. The logic then proceeds to block 502 where the logic presents at a first location information and/or content (e.g. in response to a request and/or command from a user) on an at least partially transparent display, such as e.g. text, graphics, windows (e.g. an Internet browser window, a word processor window, etc.), a user interface (UI), an icon, a notification, a widget, a tile, a photograph, an audio video presentation, a file, etc. For instance, the content and/or information may be presented at e.g. an at least partially central location relative to upper, lower, and/or side bounds of the at least partially transparent display.

After block 502 the logic moves to block 504, where the logic receives data (e.g. images) of a user's face, and specifically a user's eyes, from one or more cameras which have been actuated by the logic. Thereafter the logic moves to decision diamond 506 where, in response to receipt of the data from the cameras, the logic applies the eye tracking application to the data to determined whether the user is looking in the direction of the first location. A negative determination at diamond 506 causes the logic to move to block 508, at which the logic continues presenting the information and/or content first presented at block 502. However, an affirmative determination at diamond 506 instead causes the logic to move to decision diamond 510.

Figure 8:
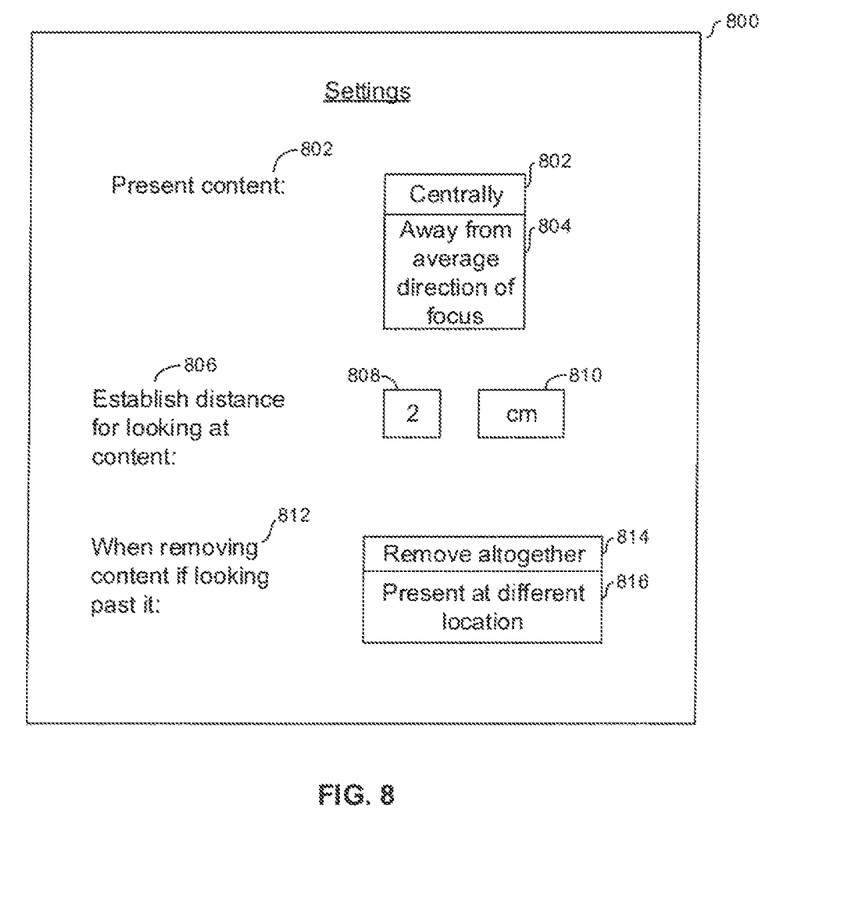
FIG. 8 is an example user interface (UI) in accordance with present principles.

At diamond 510 the logic determines, based on the data from the cameras, whether a user is looking at at least a part of the first location (such as e.g. within a threshold distance and/or threshold depth of the first location, where those thresholds may be set by a user rising a settings user interface (UI) such as the UI 800 to be described below), or looking past the first location. The logic may determine whether the user is looking at or past the first location based on the user's focus of their eyes and/or an identified focal length of the user's sight compared to a distance from the user's eyes to the at least partially transparent display (e.g. as determined and/or estimated by the logic at least in part using data from the cameras) to determine whether the user is looking e.g. at or through the first location. If the logic determines at diamond 510 that the user is looking at at least a part of the first location, the logic moves to block 508 an continues presenting the information and/or content. However, if the logic determines at diamond 510 that the user is looking past at least a part of the first location, the logic instead moves from diamond 510 to block 512.

At block 512 the logic removes the information and/or content from presentation at the first location. For instance, the logic may remove the information and/or content altogether from the display such that it is not presented anywhere. As another example, the logic may remove the information and/or content from the first location and present it instead at a second location that is not in the identified direction that the user is looking. For instance, if the user is looking through the first location where the first location is a location at or toward the center of the display, the logic may move the information and/or content to a second location toward at least one edge or boundary of the display (e.g. if the user is driving a vehicle and is looking past the centrally-disposed first location, the information and/or content may be moved to within a threshold distance of a side of the transparent display windshield opposite the side if the display windshield closest to the driver's seat).

Still in reference to FIG. 5, after block 512 the logic moves to decision diamond 514. At diamond 514 the logic determines whether the user is again looking at at least a part of the first location (e.g. which may be identified by the device as a command provided using eye input to again present the information and/or content that was removed from the first location). Responsive to an affirmative determination at diamond 514, the logic moves to block 508 where it again presents the information and/or content at the first location. Responsive to a negative determination at diamond 514, the logic instead moves to block 516 where the logic may either end and/or wait for another request for information and/or content from a user.

Figure 6:
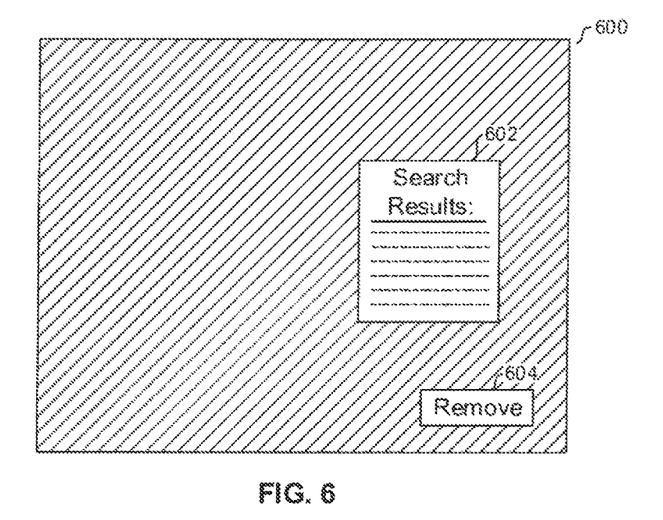
FIGS. 6 and 7 are example block diagrams of an at least partially transparent display presenting content and selector elements in accordance with present principles.

Now in reference to FIG. 6, it shows an at least partially transparent display 600 in accordance with present principles that is presenting content 602 at a first location. In the present example, the content 602 comprises Internet browser search results. Note that a remove selector element 604 is shown which is selectable by a user to without further user input remove the content 602 from presentation at the first location (e.g. removing it from the display 600 altogether, and/or presenting it at a second location and/or smaller than it is currently presented such that it does not encompass at area in the direction of the user's focus). Note that the selector element 604 may be selected based on e.g. a voice command issued by the user, and/or eye input selecting the element 604 also from the user, such as the user staring at the element 604 for a threshold time as identified by the device controlling the display 600 based on input from one or more cameras providing images of the user's eye movements, directions, and/or depths of focus. Before moving on, also note that the element 604 is selectable other ways such as e.g. using a keyboard command, using a mouse, etc.

Figure 7:
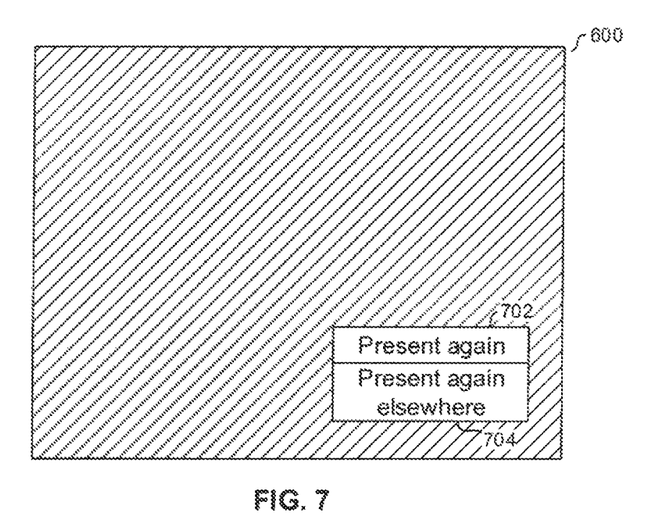

As shown in FIG. 7, the content 602 has been removed from the display 600. However, note that two selector elements 702 and 704 are shown. The element 702 is selectable e.g. based on a voice command, eye input (e.g. staring at it for a threshold time), or other kinds of input to without further user input again present the content 602 at the first location as it was presented before (e.g. as shown in FIG. 6). The element 704 is selectable e.g. based on a voice command, eye input (e.g. staring at it for a threshold time), or other kinds of input to without further user input again present the content 602 at a different location than the first location in accordance with present principles.

Continuing the detailed description in reference to FIG. 8, it shows an example settings user interface (UI) 800 for configuring one or more settings of an application and/or software for undertaking present principles. The UI 800 includes a first setting 802 regarding a location of an at least partially transparent display on which to present information and/or content (referred to below merely as "content" for simplicity). A first selector element 802 is shown which is selectable to automatically without further user input configure the device undertaking present principles to present content centrally on the display. A second selector element 804 is shown which is selectable to automatically without further user input configure the device present content dynamically at different locations based on an average direction of focus of a user past the display for a given time frame and/or session using an application for undertaking present principles. Note that the time frame and/or session may also be established by a user, although not shown on the UI 800 for simplicity. In any case, such a location may dynamically change such that wherever located on the transparent display, it is not located at least partially within an area of the display encompassing the user's average and/or primary focus direction past the display.

For example, if a user is in the driver's seat of a vehicle and it is determined by the device that the user's average direction of focus is straight out a left portion of the windshield display in front of the driver's seat, the content may be presented on a right portion of the windshield display in front of a passenger seat.

As another example, if the user's average direction of focus for pair of glasses having one or more lens displays is generally down owing to the user reading a book in their lap, the lower portion of the lens displays may be identified as being in the user's average direction of focus and hence content may be presented on an upper portion of the lens displays instead. If a user then looks up through the lens displays to begin talking to a person, the upper portion of the lens displays may be identified as now being in the user's average direction of focus past the lens displays for a most recent threshold amount of time and hence content may at that point be presented on the lower portion of the lens displays.

Moving on but still in reference to FIG. 8, the settings UI 800 also includes a second setting 806 for establishing a threshold distance between a location of presentation of content on a transparent display and an actual location on the display of the user's focus (e.g. relative to a plane established by the display) which may be identified by the device undertaking present principles as the user still looking at the content despite the device identifying the user as not looking directly at the location of presentation of the content. Thus, a number entry box 808 is shown for a user to enter a number, while an increment selector 810 may be selected to establish an increment (e.g. using a drop-down box presenting plural selections) to be associated with the number entered into the box 808. Increments may include but are not limited to e.g. millimeters, centimeters, inches, etc.

Though not shown in example FIG. 8, also note that another setting for establishing a threshold depth for identification of the user as looking at rather than past content presented at a location on a transparent display may also be provided on the UI 800, accompanied by a number entry box and increment selector similar to those described above for establishing the depth threshold.

The UI 800 may also include third setting 812 regarding what to do with content presented at a location of a display that is in the user's direction of focus but when the user is focusing past the location rather than at it. A first selector element 814 is shown which is selectable to without further user input configure the device to remove the content from the display(s) altogether. A second selector element 816 is also shown which is selectable to without further user input configure the device to present the content at a location of the display different from the location within the user's direction of focus.

Without reference to any particular figure, an example incorporating present principles will follow. Assume a user is wearing glasses such as the glasses 300 described above, and that the user is talking to two people, one person to the user's front left, and another to the user's front right. Responsive to a request for information from the user and identification by the glasses of the user as looking through the display lenses to the person on the user's front left, the glasses may present the information on the user's right lens display for viewing thereon when the user is ready to do so. Should the user then look at the person on the user's front right, the glasses may identify that the user is looking past the information and through the right lens display at a focal length beyond the distance from the user's eyes to the right lens display and hence toward the person on the user's front right, and responsive thereto the glasses may remove the information from the right lens display and not present it elsewhere, or present it on the left lens display (e.g. depending on configurations for the glasses established by the user).

Also without reference to any particular figure, it is to be understood that in some embodiments, determining whether the user is looking at least substantially at a portion of information presented on an at least partially transparent display (e.g. in the direction of the information) may include e.g. determining whether the user is looking around and/or toward the information (e.g. within a threshold distance) based on images from the cameras which communicate with the device executing eye tracking software and applying the eye tracking software to the images, determining whether the user is looking directly at a portion of the information based on images from the cameras and applying the eye tracking software to the images, and/or determining whether the user is looking within a threshold number of degrees of looking at a portion of the information based on vectors e.g. established by the user's actual line of sight toward a location on the display and established based on the actual location of presentation of the portion on the display relative to at least one of the user's eyes (e.g. using images from the cameras and applying the eye tracking software to the images).

It may now be appreciated that present principles provide for, when displaying data on a heads-up and/or head mounted display, presenting information in the user's field of vision while also not obstructing the user from being able to see things past the information when the user desires to do so. E.g., for text presented on a display of a device in accordance with present principles, the device may identify if the user is reading the text or looking between the lines of text to see a person's face beyond the text. Should the device identify that the user is focusing on something other than the text the device is displaying (such as the person's face), the device may actuate the display to be transparent and/or for the text to disappear or move out of the way of the user's focus, etc.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular PRESENTATION OF DATA ON AN AT LEAST PARTIALLY TRANSPARENT DISPLAY BASED ON USER FOCUS is herein shown and described in detail, it is to be understood that the subject matter which is encompassed by the present application is limited only by the claims.

What is claimed is:

1. A device, comprising:
a processor;
at least one at least partially transparent display accessible to the processor;
at least one eye sensor accessible to the processor; and
storage accessible to the processor and bearing instructions executable by the processor to:
present content at a first location on the at least partially transparent display;
based at least in part on data from the eye sensor, determine whether a user is looking one of at least substantially at the first location and past the first location; and
in response to a determination that the user is looking past the first location, remove the content from presentation at the first location.

2. The device of claim 1, wherein the instructions are further executable to:
in response to a determination that the user is looking at least substantially at the first location, continue to present the content at the first location.

3. The device of claim 1, wherein the determination that the user is looking past the first location is based at least in part on a focus of at least one of the user's eyes.

4. The device of claim 1, wherein the determination that the user is looking past the first location is based at least in part on a focal length of the user's focus, the focal length identified based at least in part on the data from the eye sensor.

5. The device of claim 1, wherein at least substantially at the first location is at at least a portion of the first location.

6. The device of claim 1, wherein at least substantially at the first location is within a threshold distance of the first location relative to a plane established by the at least partially transparent display.

7. The device of claim 1, wherein at least substantially at the first location is within a threshold depth of the first location.

8. The device of claim 1, wherein the instructions are executable to:
in response to the determination that the user is looking past the first location, remove the content from presentation on the at least partially transparent display.

9. The device of claim 1, wherein the instructions are executable to:
in response to the determination that the user is looking past the first location, remove the content from presentation at the first location and present at least a portion of the content at a second location on the at least partially transparent display different from the first location.

10. The device of claim 9, wherein the first location is an at least substantially central location of the at least partially transparent display relative to the bounds of the at least partially transparent display, and wherein the second location is a location within a threshold distance of at least one of the bounds of the at least partially transparent display.

11. The device of claim 1, comprising a vehicle, wherein a windshield of the vehicle comprises the at least partially transparent display.

12. The device of claim 1, comprising glasses, wherein at least one lens of the glasses comprises the at least partially transparent display.

13. The device of claim 1, wherein the instructions are executable to:
based at least in part on execution of eye tracking software using the data from the eye sensor, determine whether the user is looking one of at least substantially at the first location and past the first location.

14. The device of claim 1, wherein the content is selected from the group consisting of: text, at least one graphic.

15. The device of claim 1, wherein the instructions are executable to:
present the content at the first location on the at least partially transparent display and present at least proximate to the first location a selector element selectable to remove the content from presentation at the first location.

16. The device of claim 15, wherein the selector element is selectable at least in part based on eye input.

17. A method, comprising:
presenting information on an at least partially transparent display;
determining whether a user is focusing one of on the information and past the information; and
in response to a determination that the user is focusing past the information, removing the information from a direction of the user's focus.

18. The method of claim 17, wherein the determining whether the user is focusing one of on the information and past the information is based at least partially on data from at least one eye sensor, and wherein the data is also used to determine the direction of the user's focus.

19. Glasses, comprising:
a processor;
at least one at least partially transparent lens display accessible to the processor;
at least one eye sensor accessible to the processor; and
storage accessible to the processor and bearing instructions executable by the processor to:
present data on the at least one at least partially transparent lens display;
determine whether a wearer of the glasses is focusing one of on the data and elsewhere; and
in response to a determination that the wearer is focusing elsewhere, remove the data from a direction of the wearer's focus.

20. The glasses of claim 19, wherein the instructions are executable to:
in response to the determination that the wearer is focusing elsewhere, remove the data from the at least one at least partially transparent lens display on which it is presented; and
in response to a determination that the wearer is focusing on a location of the at least one transparent lens display on which at least a portion of the data was presented prior to removal, present the data.

* * * * *